No. 12,682. REISSUED AUG. 27, 1907.
P. C. GREENAWALT.
SAD IRON.
APPLICATION FILED SEPT. 6, 1906.
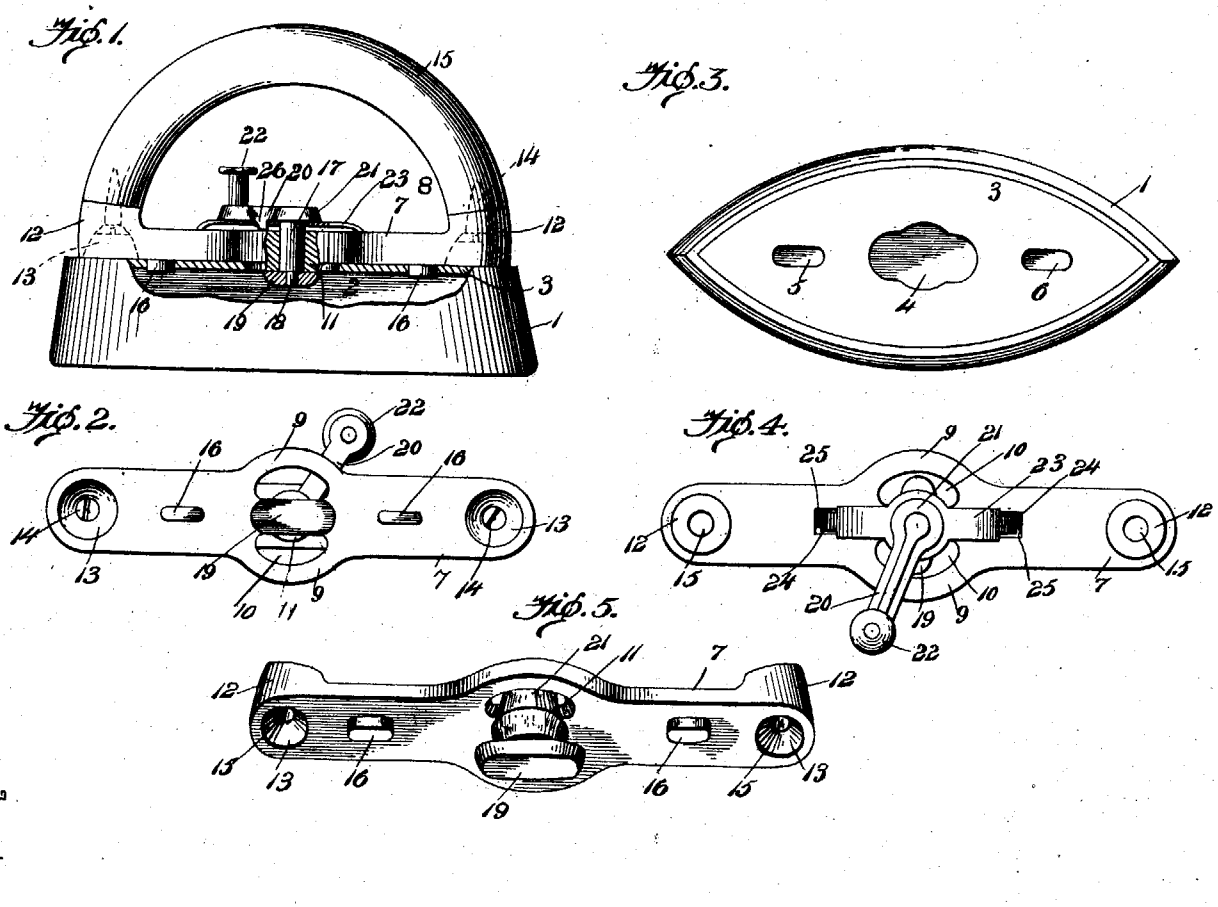
Witnesses
B. M. Offutt,
G. M. Spring.
Inventor
Peter C. Greenawalt,
By E. E. Vrooman,
his Attorney.
THE NORRIS PETERS CO., WASHINGTON, D. C.

UNITED STATES PATENT OFFICE.

PETER C. GREENAWALT, OF READING, PENNSYLVANIA.

SAD-IRON.

No. 12,682 Specification of Reissued Letters Patent. Reissued Aug. 27, 1907.

Original No. 787,289, dated April 11, 1905, Serial No. 217,047. Application for reissue filed September 6, 1906. Serial No. 333,520.

*To all whom it may concern:*

Be it known that I, PETER C. GREENAWALT, a citizen of the United States, residing at Reading, in the county of Berks and State of Pennsylvania, have invented certain new and useful Improvements in Sad-Irons, of which the following is a specification, reference being had therein to the accompanying drawing.

This invention relates to improvements in sad irons, and has for its object the provision of means for facilitating the securing or fastening of the handle to the body of the iron.

With this and other objects in view, the invention consists of certain novel constructions, combinations, and arrangements of parts, as will be hereinafter fully described and claimed.

In the drawings: Figure 1 is a view in side elevation of an iron constructed in accordance with the present invention, shown partly in section. Fig. 2 is an inverted, plan view of the handle, showing the locking device in an unlocked position. Fig. 3 is a plan view of the body of the iron. Fig. 4 is a plan view of the base-plate of the handle and the locking device carried thereby. Fig. 5 is a perspective view, looking at the bottom of the base-plate and the locking device.

Referring to the drawings, 1 designates the iron-body, which is hollow at 2. The top portion 3 of the iron-body 1 is provided with a plurality of alined apertures 4, 5, and 6. The central aperture 4 is preferably of elliptical form, and is considerably larger in dimension than the apertures 5 and 6. It is to be noted that the pair of apertures 5 and 6 are formed in the top portion 3 of the iron-body at diametrically opposite points opposite the ends of the elongated or elliptical, central aperture 4.

The base-plate 7 of the handle 8, Fig. 1, comprises a flat body provided with outwardly curved, laterally extending webs 9, 9 and with elongated apertures 10, 10. The apertures 10, 10 are formed in the base-plate 7 upon opposite sides of the hub 11. The webs 9 form a comparatively broad, central base-portion for the base-plate, thereby permitting the end-portions of said plate to be made comparatively small. One of the advantages of enlarging the central portion of the base-plate is that, while the weight of the base-plate is not increased, by reason of apertures 10, still an efficient structure is produced, which will not tip or fall over when placed upon the iron prior to fixedly securing the handle to the body of the iron, as will be hereinafter specifically described. The apertures 10 of the base-plate not only reduce the weight of the base-plate, but also assists in keeping the hub-structure cool. The base-plate is provided, at its ends, with annular posts 12, 12, which posts are formed integral with said base-plate. The base-plate is formed, near its ends, with recesses or hollow portions 13. These recesses or hollow portions 13 extend a considerable distance into the posts 12, 12, thereby producing hollow post-structures within which screws 14 are positioned for securing the grip portion 15 (formed preferably of non-conductive material, as for instance, wood) to the base plate of the handle 8. The screws 14 extend through apertures 15 formed in the posts 12.

Formed integrally upon the bottom of the base-plate 7, and upon opposite sides of the hub-structure 11, are depending studs 16. These studs 16 register with the apertures 5 and 6, of the top portion 3 of the body 1. The integral, depending studs 16 prevent lateral movement of the handle after the same has been positioned upon the body. It will also be obvious that said handle will not be displaced, prior to fixedly securing the same to the body by the locking device, by reason of the studs 16 and the hub 11 being positioned within their respective apertures.

If it is desired to move the body of the iron over a surface, as for instance, the top of a stove, before the handle is fixedly secured to said body, this can easily be accomplished by placing the studs 16 in the apertures 5 and 6 of the body portion 3, and shoving the body to the desired position. After the body has been positioned, the handle can then be quickly detached by lifting the same off of the body. It is also to be noted that the body 1 can be turned to any desired position through the medium of the integral, depending studs 16, for when the handle is in position upon said body, independent, rotary movement of the handle and body will be prevented.

The locking device for fixedly securing the handle 8 to the body 1 comprises a vertical post 17, rotatably mounted in the hub 11. The post 17 is provided with a reduced portion or extension 18, which extension constitutes a pin or rivet that extends through the elongated head 19. Through the medium of this extension 18, the head 19 is securely fastened to the post 17. The upper portion of the head 19 is flat and engages the bottom of the top portion 3 of the body 1, when the locking device is in its locked position upon the bottom. Formed integrally with the upper end of the post 17 is a horizontal, solid lever 20. The lever 20, at its inner end, is provided with an enlarged portion 21, which is of greater diameter than the apertured portion of the hub 11, within which apertured portion the post 17 is positioned or journaled. Positioned above and secured to the outer end of the horizontal, straight lever 20, is a grip 22, formed of non-conductive material. An inwardly bowed spring 23 is positioned upon the post 17 between the enlarged portion 21 of the lever and the top face of the base-plate 7. This bowed spring 23 has its ends reduced, as at 24, and these reduced ends 24 are seated within recesses or sockets 25, formed in the top of the base-plate 7. By reason of these sockets or recesses 25, rotary movement of spring 24 is prevented upon the post 17. The spring 23, at all times, exerts an upward pull on the post 17, thereby binding the elongated or elliptical head 19 against the inward face of the top portion 3 when the head is in its locked position upon the body 1. By reason of this resilient means or spring 23, a highly efficient device is produced, because said spring compensates for any wear of the locking device, thereby preventing the locking device from becoming loose upon the base-plate. A vertical lug 26 is formed upon the lever 20, and as the spring 23 is placed in the path of movement of said lug, rotary movement of the post 17 will consequently be limited through the medium of this lug. When the lever 20 is in the position shown in Fig. 1, the locking device is in its locked position upon the body 1 with the lug 26 engaging a portion of the spring upon one side of the post 17, whereas, when rotary movement is imparted to the lever 20, and the lug 26 is swung to engage the spring upon the opposite side of the post 17, rotary movement of post 17 and head 19 will be limited, and said head will be positioned, as shown in Fig. 2, whereby the handle can be quickly lifted from the body of the iron. I have, therefore, produced a locking device for securing a handle to the body of an iron, which locking device is provided with a lug, and means engaging said lug for limiting rotary movement of the post 17, carrying the head 19.

When it is desired to fixedly secure the handle 8 to the body of the iron 1, the operator grasps the grip 22 of the locking device, and when the locking device is in the position shown in Fig. 2, swings the lever from right to left for placing the head at substantially right-angles to the base-plate 7. By swinging the lever 20 from left to right, the head is placed in an unlocked position, whereby the handle can be lifted off of the body.

What I claim is:

1. In a sad iron, the combination with a body, a handle carried by said body, of a revoluble post carried by said handle, a head secured to said post, a lever in engagement with said post, a bowed spring positioned upon said post between said lever and handle, and means engaging said spring for limiting movement of said post.

2. In a sad iron, the combination of a body having a compartment formed therein, said body having an opening communicating with said compartment, a handle assembled with said body provided with a fastening mechanism carried by the base thereof, comprising a post, a head secured near one end of said post upon one side of said base, a lever secured to said post near the opposite end thereof, and a bowed flexible member mounted upon said post intermediate of said lever and base, said head being adapted to be positioned within the opening of said body for retaining said handle in an assembled position with the body.

3. In a sad iron, the combination with a body, a handle secured thereto, of a locking mechanism carried by said handle, comprising a movable member, a head secured near one end of said member, lever means secured to said member near the opposite end, an integral lug projecting from said lever means for limiting movement of said member, and a bowed spring surrounding said movable member intermediate its length and positively secured to said handle.

4. In a sad iron, the combination of a body having a top, said top provided with a plurality of apertures, a handle removably mounted upon said body, comprising a base portion, a removable, arched grip secured to said base portion, said base portion having a central aperture and a plurality of recesses formed upon its upper surface, a post journaled in said central apertured portion, a head secured to said post near the lower end thereof, a lever secured to the opposite end of said post, said lever comprising a body portion provided with extensions projecting therefrom upon opposite sides thereof, a grip carried by one of said extensions, an approximately flat spring bowed intermediate its ends and having notched end portions mounted upon said post adjacent to said lever, said notched ends normally projecting into the recessed portions of said base of the handle, and a plurality of integral studs projecting from the lower surface of said base and normally engaging part of said apertures formed in the top of said body.

5. In a sad iron, the combination with a body, of a handle provided with a base portion, positioned thereon, locking means carried by said handle, comprising a revoluble member, a head secured to said revoluble member, lever means secured to said revoluble member, a spring positioned upon said revoluble member between said lever means and base portion of the handle, and means formed upon the lever means adapted to engage said spring for limiting movement of said revoluble member.

6. In a sad iron, the combination with a body, a handle positioned thereon, of locking means carried by said handle, comprising a revoluble member, a head secured to said revoluble member, lever means carried by said revoluble member, cushioning means assembled with said revoluble means and handle, and means carried by said lever means adapted to engage said cushioning means for limiting movement of said revoluble member.

7. In a sad iron, the combination with a body, a handle positioned thereon, of locking means for securing said handle in a positive assembled position with said body, comprising a revoluble member carried by said handle, a lever secured to said member, a head formed upon said member, flexible means positioned upon said handle for normally holding the head of said revoluble member in a positive engaging position with said body, and means extending from said lever, adapted to engage said flexible means for limiting movement of said revoluble member.

8. The combination with a body, a handle removably positioned thereon, of a locking mechanism carried by said handle, comprising a movable member, a head secured near one end of said member, a lever mounted upon the opposite end of said member, flexible means interposed between said lever and handle, and means carried by said lever, adapted to engage said flexible means for limiting movement of said member and its head.

In testimony whereof I hereunto affix my signature in the presence of two witnesses.

PETER C. GREENAWALT.

Witnesses:

ALBERT B. KAUFMANN,
FRANK A. SCHOTT.